INVENTOR.
B. L. GRAHAM

Sept. 15, 1953  B. L. GRAHAM  2,651,922
CRYSTALLIZATION PROCESS AND APPARATUS
Filed Sept. 2, 1949  3 Sheets-Sheet 2

INVENTOR.
B. L. GRAHAM

ATTORNEYS

Patented Sept. 15, 1953

2,651,922

UNITED STATES PATENT OFFICE 2,651,922

CRYSTALLIZATION PROCESS AND APPARATUS

Benton L. Graham, Cactus, Tex., assignor to Phillips Petroleum Company, a corporation of Delaware Application September 2, 1949, Serial No. 113,861

9 Claims. (Cl. 62—124)

This invention relates to the separation of mixtures of organic compounds by crystallization. In a more specific aspect, it relates to the separation of binary mixtures into two fractions, one of which is substantially pure. In another specific aspect, it relates to the multi-stage separation of binary mixtures. In another specific aspect, it relates to an apparatus for carrying out these separations.

In the separation of binary mixtures of compounds by crystallization methods, it is theoretically possible to obtain at least one of the components in substantially pure form. If the starting mixture is a eutectic-forming mixture, a one-step process would theoretically give one fraction comprising the saturation component of the original mixture in substantially pure form and another fraction comprising the eutectic mixture. If the starting mixture is a solid solution-forming mixture, a multi-stage separation process should result in complete separation into two substantially pure components.

Various processes and machines have been used for effecting the separation of binary mixtures by crystallization. The processes usually comprise the step of freezing a portion of the liquid, removing the solidified portion and re-melting it to form a new mother liquor from which a new portion is frozen and removed. By a sufficient number of these steps, it is possible to separate the starting mixture into at least one pure component and a second fraction, which may or may not be pure.

The amount of mother liquor occluded or entrapped by the crystals formed is ordinarily so great that it is necessary to have some positive means for excluding the occluded impurities if a reasonable degree of separation is to be accomplished by each crystallization. I have discovered a process and apparatus by which it is posssible to remove substantially all of the occluded impurities from the crystals so that I am able to obtain at least one of the components of the starting mixture in substantially pure form.

An object of my invention is to provide a process for separating binary mixtures into their components.

Another object is to provide a multi-stage crystallization process.

Still another object is to provide an apparatus for effecting these separations by crystallization and for excluding the occluded impurities from the crystals formed in each step.

Other objects and advantages of my invention will be apparent from a study of the following drawings, description and claims.

Figure 1:
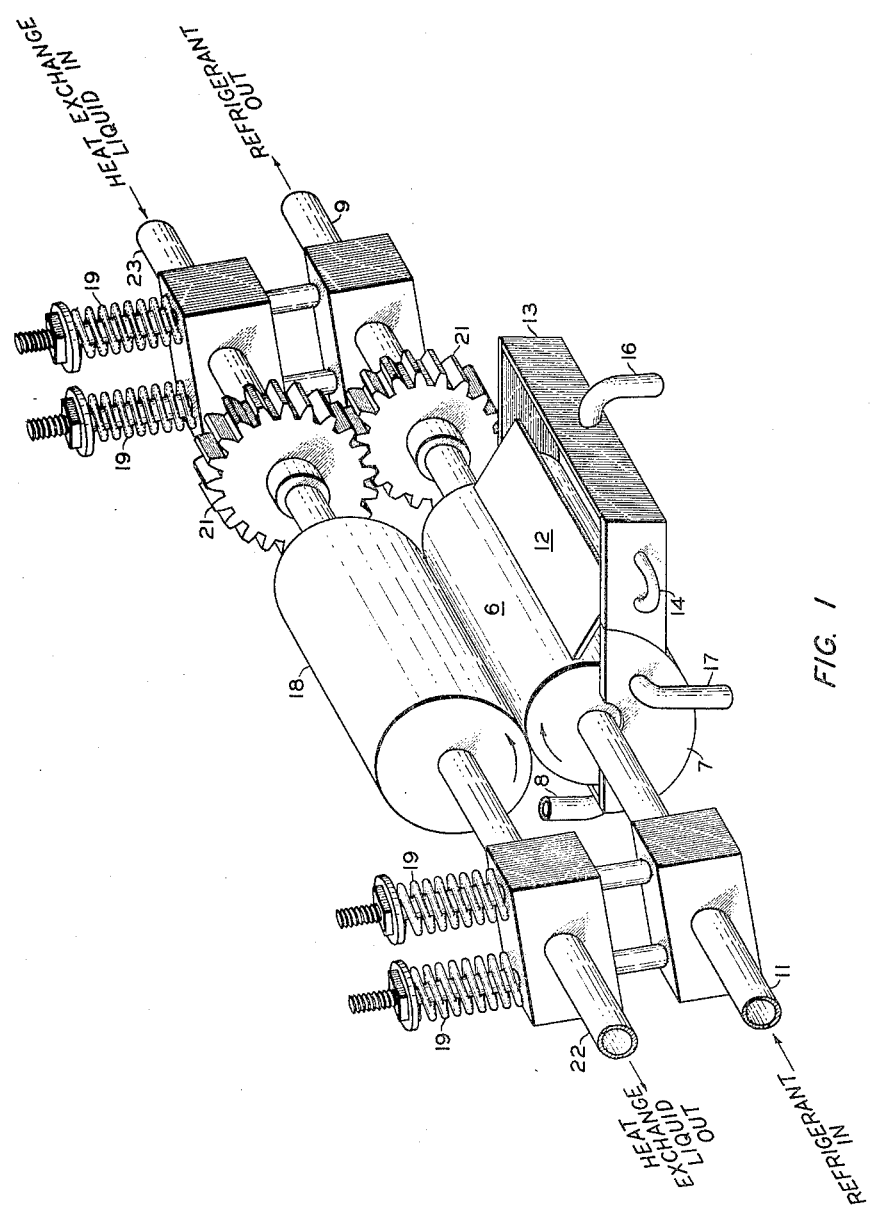
Figure 1 is an elevational view of a single stage apparatus for carrying out my process.

In Figure 1, an internally-cooled drum 6 is positioned above and dips into trough 7 into which the starting mixture is fed through inlet 8. A cooling liquid is passed into drum 6 through inlet 11 and is removed therefrom through outlet 9. The material which freezes on the surface of drum 6 is removed by a scraper blade 12 and falls into a receptacle 13 which is heated by means of coil 14. The melted product is removed from receptacle 13 through outlet 16. Outlet 17 is provided for removing the mother liquor from trough 7. Positioned above drum 6 and in contact therewith is a second drum 18 which is biased against drum 6 by means of springs 19. Drum 18 is geared to drum 6 by means of gears 21 and drum 6 is driven by a motor or engine, not shown. A heating liquid is passed into drum 18 through inlet 23 and is removed therefrom through outlet 22.

Figure 2:
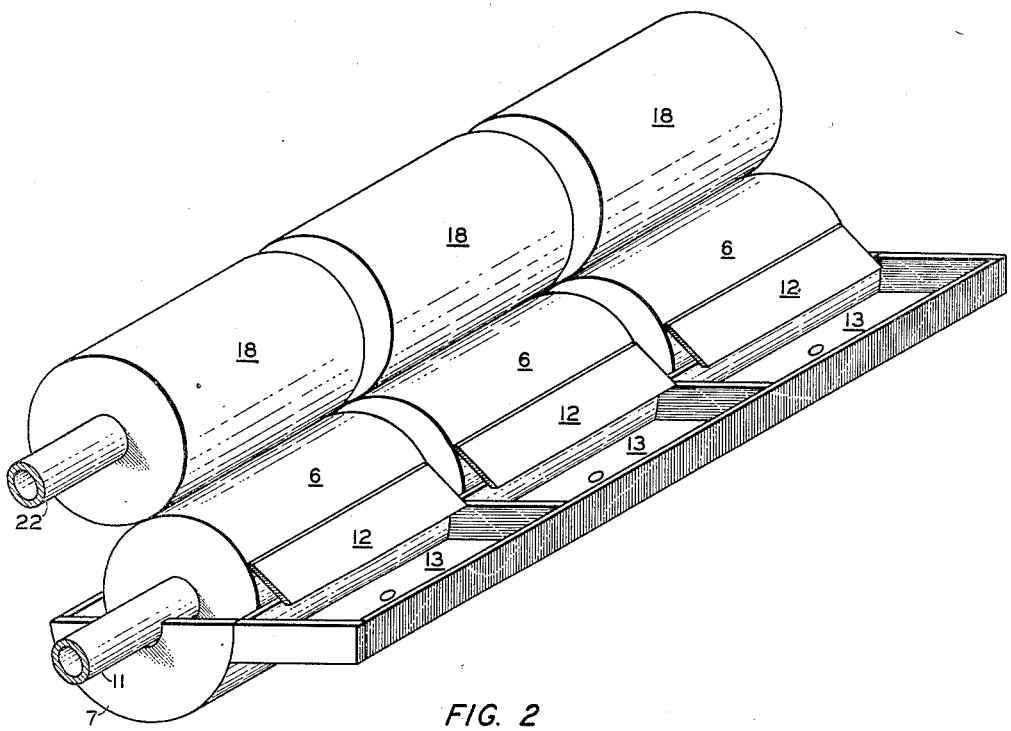
Figure 2 is an elevational view of a multi-stage modification of my apparatus.

Figure 2 is a three-stage apparatus having freezing drums 6, troughs 7, scraper blades 12, receptacles 13, coolant inlet 11, and upper drums 18.

Figure 3:
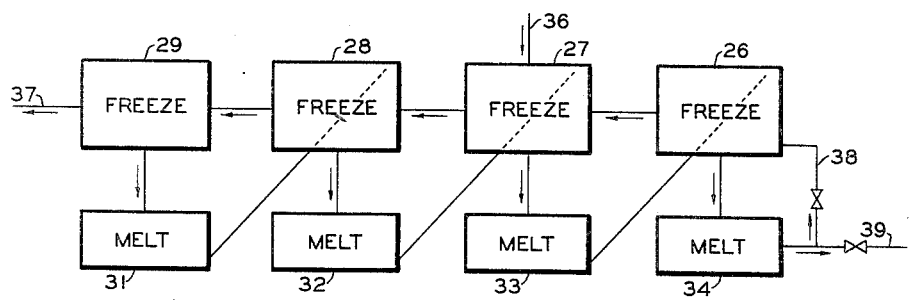
Figure 3 is a schematic flow diagram showing the flow of materials through my multi-stage process.

Figure 3 shows the flow of material through a four-stage process. This diagram shows four freeze troughs 26, 27, 28, and 29 and four melting receptacles 31, 32, 33, and 34. The fresh feed is introduced into freeze trough 27 through feed line 36. The material removed from freeze trough 27 by the freeze drum rotating therein is deposited in melt receptacle 33 and the unfrozen mother liquor overflows into freeze trough 28. The overflow from trough 28 flows into freeze trough 29 and the overflow therefrom is removed from the system through outlet 37. The melted material in each melt receptacle, except receptacle 34, flows into the opposite side of the next adjacent freeze trough upstream. The melt in receptacle 34 may be recycled into freeze trough 26 by means of line 38 or it may be removed through product line 39.

Figure 4:
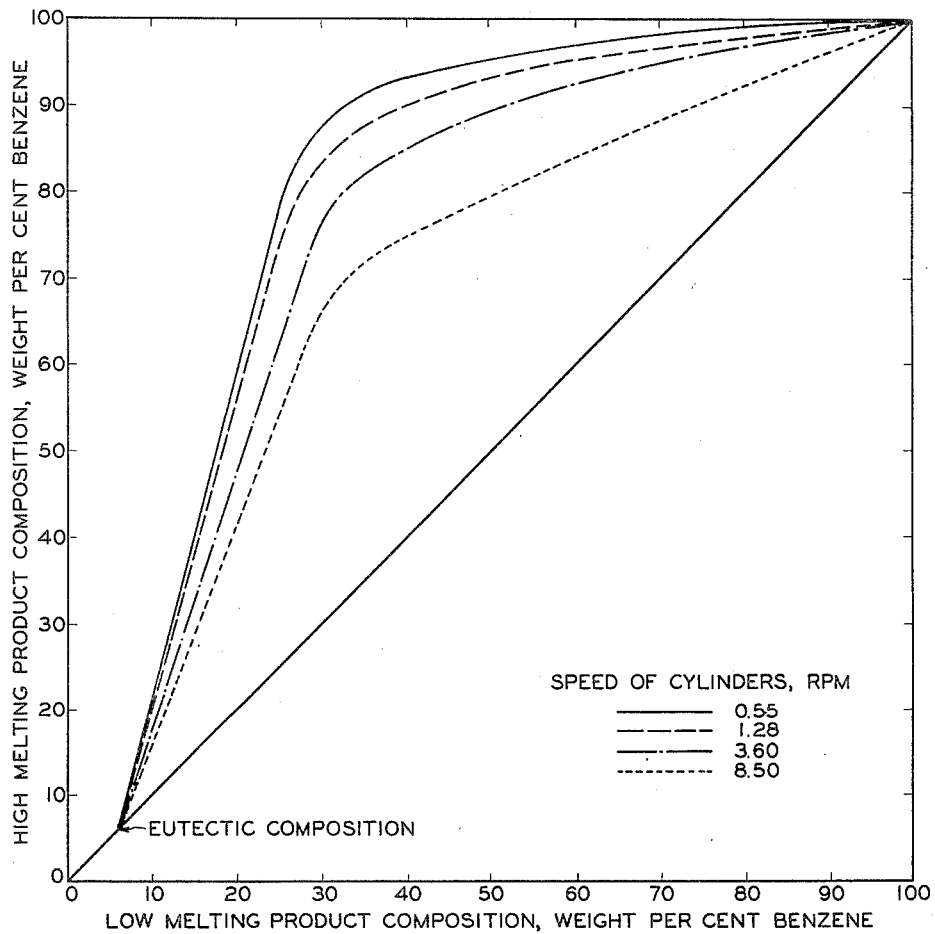
Figure 4 is a series of curves showing the composition of the products obtained in a single-stage crystallizer using benzene and normal hexane as a starting mixture.

The curves shown in Figure 4 represent the composition of the products that can be obtained in a single unit apparatus, such as that shown in Figure 1. The various curves show the separation obtained at the indicated cylinder speeds. The force supplied to the upper cylinder was 400 pounds and the feed comprised benzene and normal hexane.

In explaining my process, I shall refer to 6 as the freeze drum and 18 as the squeeze drum. The freeze drum must be cooled to a temperature below that at which crystals begin to form in the mixture in the trough. The particular refrigerant used will, of course, depend upon the particular feed. For very low temperatures, I have used acetone cooled by passing it through a coil submerged in a bath of acetone and Dry Ice. For large scale operation, less expensive cooling should be used.

A heat transfer liquid is circulated through squeeze drum 18. The temperature therein must be higher than the temperature in the freeze drum but should not be above the melting point of the material being removed as a solid on the freeze drum. Preferably, the temperature of the squeeze drum is maintained as low as possible to still give the requisite purity of product. The nearer the temperature of the squeeze drum approaches the temperature of the material being removed as a solid, the purer will be the material, but the lower will be the yield.

The multi-stage apparatus can be one such as that shown in Figure 2 wherein the squeeze drums have a common axle and rotate at the same speeds. If desired, a plurality of the units shown in Figure 1 may be used and each unit may have a particular speed of its own. If the freeze drums are on a common axle, the speed is regulated to give maximum removal from the trough in which crystal formation is slowest. This means that the drums in the other troughs may not always be completely coated. This type of apparatus is not as flexible as that wherein a plurality of single unit crystallizers are used but it has the advantage of being simpler in construction and operation.

The operating variables include the force applied to the crystals by the squeeze cylinder, cylinder speed, freeze-cylinder temperature, squeeze cylinder temperature, and feed composition. If the material freezes out on the drum as a hard cake, the force applied by the squeeze-cylinder may be high. If, however, the material forms a gummy mass on freezing, the force applied must be reduced because too much pressure will cause the crystals to slough off or refuse to pass.

The pressure applied by the squeeze-cylinder has a dual purpose. Any liquid occluded or entrapped within the crystal mass is squeezed out. The high pressure applied to the crystals as they pass between the cylinders increases the freezing point of the materials which causes an additional amount to solidify. The heat given up when this additional amount solidifies melts a portion of the lower melting component which is present as a solid to result in better separation. The liquid squeezed from the crystals runs down the freeze drum and has a reflux action on the film of material deposited thereon.

The advantages of my invention will be better understood from a study of the following specific examples which have been selected to explain the operation of my invention.

These tests were carried out with a machine similar to that shown in Figure 1. The squeeze and freeze drums were each three inches in diameter and four inches in length. The drums were forced together by four springs, which were calibrated to permit determination of the force applied by each according to its length. The exact pressure exerted by the drums on the crystals is not known because the contact area could not be measured.

The rotary crystallizer was placed in operation by filling the freezing trough with the feed mixture, adjusting the feed rate, adjusting the compression springs to give the desired force on the squeeze cylinder, starting the motor which drove the cylinders and then starting the flow of the refrigerant through the freeze drums. When the crystals began to form on the freeze cylinder, the flow of warm water through the squeeze cylinder was started. The crystals were then scraped from the freeze cylinder and deposited in the melting compartment.

After about 30 minutes operation, the process had become lined out and the test period was started. During the test periods, which were normally 30 minutes, the crystal and liquid products were collected, measured, and their compositions determined. For tests 1 through 4, the feed material was a benzene-n-hexane mixture.

EXAMPLE I

This test was carried out to determine the effect of varying the pressure of the squeeze cylinder on the freeze cylinder. The freeze cylinder temperature was −40° F. and the squeeze cylinder temperature was 75° F. The cylinder speed was 3.6 R. P. M. The results are shown in the following table:

Table 1

| Force Applied by Squeeze Cylinder, lbs. | Feed Rate, ml./hr. | Yield of High-Melting Product, Vol. Percent of Feed | Compositions, Weight Percent Benzene | | |
|---|---|---|---|---|---|
| | | | Feed | High-Melting Product | Low-Melting Product |
| 0 | — | 33.2 | 76 | 78 | 75 |
| 0 | — | 49.9 | 76 | 77 | 75 |
| 400 | 880 | 35.5 | 76 | 92 | 68 |
| 400 | 760 | 38.2 | 76 | 90 | 68 |
| 600 | 730 | 41.5 | 76 | 97 | 61 |
| 600 | 700 | 41.5 | 76 | 97 | 61 |

It is seen that the separation achieved without the application of pressure is negligible. Increasing the pressure on the crystals is shown to increase the purity of the products.

EXAMPLE II

This test was carried out to determine the effect of cylinder speed upon the performance of the crystallizer. The operating conditions for this test were the same as those for Example I except that the force on the freeze cylinder was maintained constant at 400 pounds and the speed of the cylinders was varied. As was to be expected, the purity of the products decreases with an increase in the speed of rotation. At slower speeds, slight increases in the speed of rotation have no substantial effects. The results were as indicated in the following table:

Table 2

| Speed of Cylinders, R. P. M. | Feed Rate, ml./hr. | Yield of High-Melting Product, Vol. Percent of Feed | Compositions, Weight Percent Benzene | | |
|---|---|---|---|---|---|
| | | | Feed | High-Melting Product | Low-Melting Product |
| 0.55 | 250 | 30.7 | 51 | 88 | 35 |
| 1.28 | 280 | 28.5 | 53 | 89 | 44 |
| 3.6 | 600 | 29.1 | 51 | 82 | 42 |
| 8.5 | 670 | 19.0 | 51 | 77 | 44 |

EXAMPLE III

This test was carried out to determine the effect of the freeze cylinder temperature on the purity of the products. The cylinder speed was 1.28 R. P. M., the squeeze cylinder temperature was 75° F. and the force on the freeze cylinder was 400 pounds. The following results indicate an increase in the purity of the product with an increase in the freeze cylinder temperature. The temperature differential between the freeze cylinder and the freezing point of the test mixture decreased as the freeze cylinder temperature was increased. The increase in product purity was probably due to slower rate of crystal growth on the freeze cylinder and less occlusion of liquid. The results of this test were as shown in the following table:

Table 3

| Freeze-Cylinder Temp., °F. | Feed Rate, ml./hr. | Yield of High-Melting Product, Vol. Percent of Feed | Compositions, Weight Percent Benzene | | |
|---|---|---|---|---|---|
| | | | Feed | High-Melting Product | Low-Melting Product |
| −80 | 110 | 20.3 | 76 | 95 | 72 |
| −70 | 280 | 75.0 | 76 | 93 | 46 |
| −60 | 290 | 60.0 | 76 | 97 | 52 |
| −40 | 180 | 52.0 | 76 | 97 | 57 |
| −20 | 360 | 16.3 | 76 | 99.5 | 73 |

EXAMPLE IV

To test the effect of the squeeze temperature cylinder on the crystallizer performance, a cylinder speed of 0.55 R. P. M., a freeze cylinder temperature of −64° F., and a force of 400 pounds on the squeeze cylinder was used. The data indicate that the purity of the high-melting product increases with an increase in the squeeze cylinder temperature. This probably results from increased fractional melting of the crystals as the temperature is increased. The additional washing resulting from the additional amount of the crystals melted is probably another factor in the increased purity. The data also indicate that the yield decreases as the temperature increases. This was to be expected. The following results were obtained:

Table 4

| Squeeze Cylinder Temp., °F. | Feed Rate, ml./hr. | Yield of High-Melting Product, Vol. Percent of Feed | Compositions, Weight Percent Benzene | | |
|---|---|---|---|---|---|
| | | | Feed | High-Melting Product | Low-Melting Product |
| 60 | 380 | 37.8 | 53.0 | 86.0 | 33.0 |
| 75 | 380 | 25.3 | 51.0 | 87.0 | 37.0 |
| 80 | 350 | 25.7 | 51.0 | 88.0 | 37.0 |
| 90 | 170 | 25.9 | 51.0 | 95.0 | 41.0 |

EXAMPLE V

This test was carried out to determine the separation to be achieved with a feed mixture of meta-xylene and para-xylene. The cylinder speed was 2.82 R. P. M., freeze cylinder temperature was −40° F., squeeze cylinder temperature was 60° F. and the force applied by the squeeze cylinder was approximately 200 pounds. It was necessary to use a smaller force with the meta, para-xylene system than with the benzene-n-hexane system because the mixed xylene crystals were somewhat pasty and sloughed off the freeze cylinder when the pressure was too high. The results of this test were as indicated in the following table:

Table 5

| Feed Rate, ml./hr. | Yield of High-Melting Product, Vol. Percent of Feed | Compositions, Weight Percent Para Xylene | | |
|---|---|---|---|---|
| | | Feed | High-Melting Product | Low-Melting Product |
| Total reflux | | 27 | 60 | 24 |
| 600 | 30 | 60 | 80 | 52 |
| 500 | 22 | 60 | 81 | 54 |
| 550 | 20 | 60 | 79 | 56 |

The foregoing examples have been presented for the purpose of more fully explaining the operation of my invention. It is not intended that my invention be limited to the specific systems used, but it is applicable to any system whose components are not decomposed by melting or freezing. The scope of my invention is defined by the following claims.

Having described my invention, I claim:

1. The method of resolving a mixture of compounds into a higher-melting fraction and a lower-melting fraction which comprises freezing a portion of the mixture, removing the frozen portion from contact with the liquid, mechanically expressing the occluded mother liquor from the solid, returning the expressed liquid as reflux over the removed frozen portion to the mother liquor, re-melting the solid out of contact with its mother liquor to form a new mother liquor and repeating the step described.

2. The method of separating a mixture of compounds into a higher-melting fraction and a lower-melting fraction which comprises maintaining a body of the mixture as a liquid, continuously removing and simultaneously freezing a film of said mixture, maintaining said film at a temperature between the freezing point of the lower-melting fraction and that of the higher-melting fraction, pressing the frozen film to express the occluded mother liquor, recovering the frozen film as a higher-melting fraction, and returning the expressed liquid to the body of liquid mixture as reflux over the film of said mixture.

3. A crystallization apparatus which comprises, in combination, a pan for containing the liquid material to be separated, a first internally cooled rotatable drum adapted to dip into said pan, a scraper blade biased against said drum for removing frozen material therefrom, a second drum positioned above and parallel with said first drum and biased against said first drum, and means for maintaining said second drum at a temperature higher than said first drum.

4. A crystallization apparatus which comprises, in combination, a shallow pan, a lower drum rotatably mounted above said pan and adapted to dip into said pan, means to cool said lower drum interiorly, a scraper blade biased against said lower drum on the down-side with respect to the rotation thereof, an upper drum rotatably mounted above and parallel with said lower drum, said upper drum being biased against said lower drum and cooperating therewith to rotate in the opposite direction, means for warming said upper drum interiorly, and means for rotating said drums.

5. A crystallization apparatus comprising, in combination, a rotatable flaker drum, a trough under said drum, said drum being positioned to dip into said trough, a scraper blade biased against the periphery of said drum, means for internally cooling said drum, a second drum rotatably mounted above and parallel with said flaker drum, said second drum being biased against said flaker drum, means for maintaining said second drum at a temperature higher than said flaker drum and means for rotating said drums.

6. A crystallization apparatus which comprises, in combination, an elongated trough having an inlet at one end and an outlet at the other, a plurality of transverse baffles dividing said trough into a plurality of shorter troughs, a plurality of in-line, internally-cooled flaker drums rotatably mounted above said troughs and dipping thereinto, a scraper blade at the rear of each drum for removing frozen material therefrom, a receptacle behind each drum for receiving the material so removed, a conduit connecting each receptacle with the next adjacent trough towards the inlet end, an internally heated roll positioned above and biased against said flaker drums, and means for rotating said drums.

7. A crystallization apparatus which comprises, in combination, a first roller, means for depositing a layer of the mixture to be processed on the periphery of said first roller, a second roller parallel with and biased towards said first roller, means for maintaining said second roller at temperature higher than said first roller, said first and second rollers cooperating on being rotated to apply pressure to the material deposited on the periphery of said first roller, and means for removing said layer of material from said first roller after the squeeze treatment.

8. The method of separating a mixture of compounds into a higher-melting fraction and a lower-melting fraction which comprises maintaining a body of the mixture as a liquid, continuously removing and simultaneously freezing a film of said mixture, maintaining said film at a temperature between the freezing point of the lower-melting fraction and that of the higher-melting fraction, continuously pressing the frozen film to express the occluded mother-liquor, passing the expressed occluded mother-liquor over the frozen film as reflux, and recovering the frozen film as a higher-melting fraction.

9. The method of resolving a mixture of compounds into a higher melting fraction and a lower melting fraction which comprises passing said mixture of compounds successively through a plurality of freeze zones, freezing a portion of the mixture on a rotating body in each said freezing zone, removing the frozen portion from contact with the liquid mixture, mechanically expressing the occluded mother-liquor from the solid, returning the expressed liquid as reflux over the removed frozen portion to the mother-liquor, remelting the solid out of contact with its mother-liquor to form a new mother-liquor, and passing the new mother-liquor to a freezing zone upstream of the freezing zone from which it is obtained as a solid.

BENTON L. GRAHAM.

References Cited in the file of this patent

UNITED STATES PATENTS

| Number | Name | Date |
|---|---|---|
| 306,543 | Smith | Oct. 14, 1884 |
| 1,560,473 | Howard | Nov. 3, 1925 |
| 1,906,534 | Burke | May 2, 1933 |
| 2,131,333 | Schweinitz | Sept. 27, 1938 |
| 2,308,541 | Raver | Jan. 19, 1943 |
| 2,435,792 | McArdle et al. | Feb. 10, 1948 |
| 2,470,116 | Swietoslawski et al. | May 17, 1949 |